D. VECCHINI.
TRITURATING MACHINE.
APPLICATION FILED MAY 21, 1914.

1,159,138.

Patented Nov. 2, 1915.
2 SHEETS—SHEET 2.

Witnesses
Philip E. Barnes
M. J. L. Higgins.

Inventor
Dominique Vecchini
by Henry Orth
Attorney

UNITED STATES PATENT OFFICE.

DOMINIQUE VECCHINI, OF NEW YORK, N. Y., ASSIGNOR, BY MESNE ASSIGNMENTS, TO FRANCO-AMERICAN RUBBER COMPANY, OF WILMINGTON, DELAWARE.

TRITURATING-MACHINE.

1,159,138.     Specification of Letters Patent.     Patented Nov. 2, 1915.

Application filed May 21, 1914. Serial No. 840,084.

*To all whom it may concern:*

Be it known that I, DOMINIQUE VECCHINI, a citizen of the Republic of France, residing at New York city, in the State of New York, have invented certain new and useful Improvements in Triturating-Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to the extraction and withdrawal of rubber from rubber-bearing plants or rubber-like-bearing plants or shrubs.

All processes now in existence for the extraction of rubber from Guayule shrubs are based on the principle of grinding and pulverizing the shrubs, so as to obtain the separation of the rubber by flotation.

There are a great number of rubber plants wherein the rubber is in the form of filaments and not vesicles, as in the Guayule shrubs. If the Guayule process is applied to such rubber-bearing plants it is impossible to obtain the rubber, because the crushing and cutting will necessarily reduce the filaments of rubber to such a state as to make it impossible to agglomerate. It is therefore necessary to construct a machine that has a triturating action without a cutting action, so that the plants can be triturated without tearing or severing the rubber vesicles.

The subject matter of this application is such a machine, illustrated by way of example in the accompanying drawings, in which—

Figure 1:
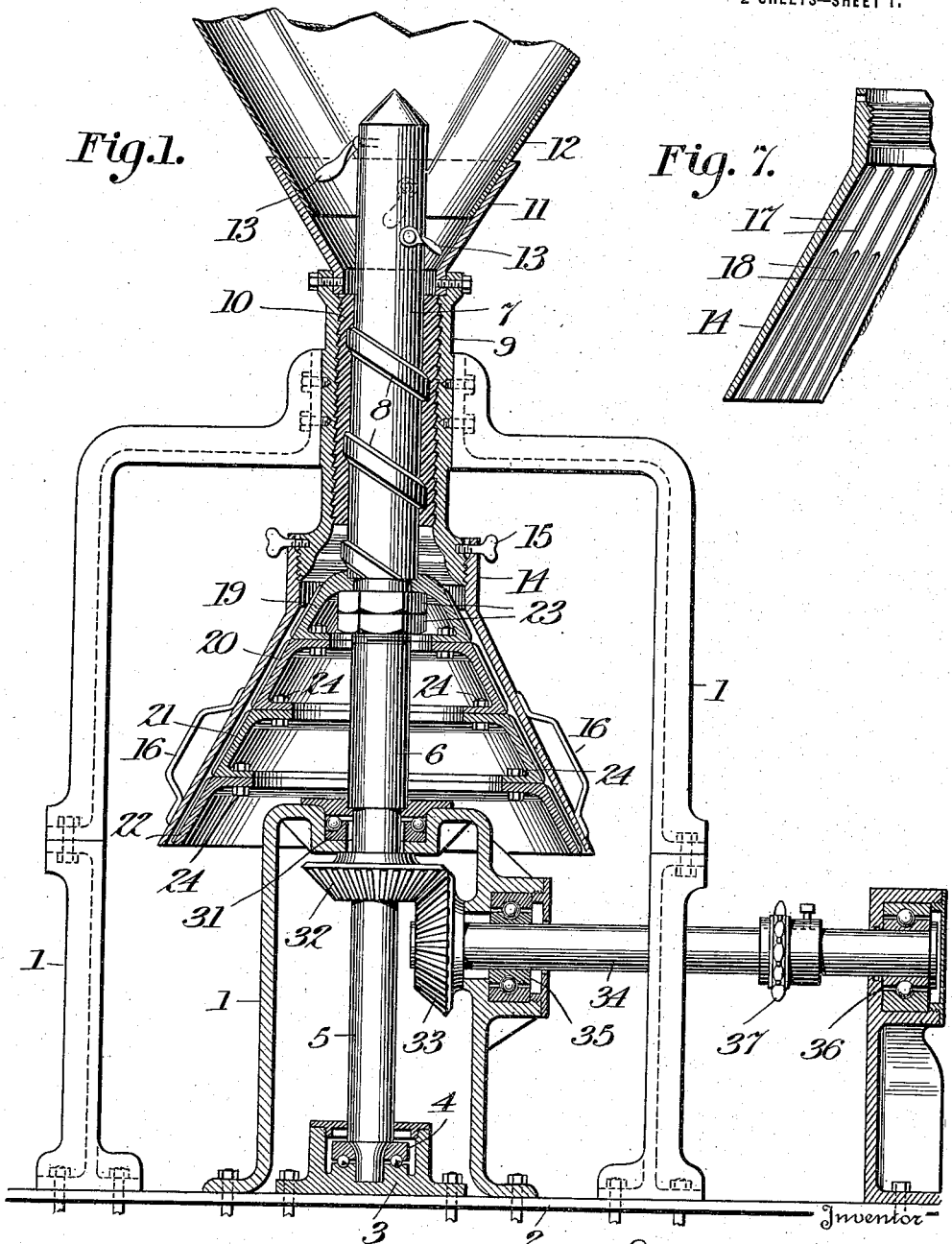
Figure 2:
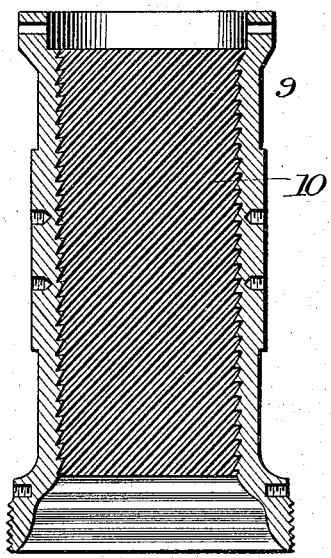
Figure 8:
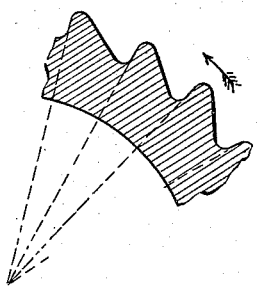

Figure 1 is a vertical section, partly in elevation. Fig. 2 is a detail view of the outer triturating element for the first stage; Figs. 3, 4, 5 and 6 are views illustrating, respectively, the inner triturating elements for the second, third, fourth and fifth stages; Fig. 7 is a detail view of a portion of the outer triturating element that coöperates with the elements illustrated in Figs. 3, 4, 5 and 6. Fig. 8 is a cross-section showing the profile of the triturating ribs.

The machine comprises a frame 1, having a cast-iron bed-plate 2, on which is secured a step or bearing 3, containing a ball thrust-bearing 4 for the reduced end 5 of the grinding shaft 6, the upper end 7 of which is provided with one or more triturating helices or spirals 8.

Whether one or more triturating helices 8 are used, will depend, in general, upon the average size of the shrubs; for small shrubs a number of such spirals may be formed on the shaft. There may be several such shafts, 5, 6, 7, each having a different number of triturating elements, at hand for mounting in the machine, as occasion may require.

The frame 1, supports a sleeve-like triturating element 9, for coöperation with the element 8, and is provided on its inner surface with helical grooves 10. A hopper 11 is secured to element 9 and has a sheet-iron extension 12. The upper end of the shaft portion 7 projects into the hopper 11 and extension 12, and has blades 13 secured thereto for feeding the shrubs between the triturating surfaces 8 and 10. On the lower end of the triturating element 9 is screwed the conical triturating element 14 provided with locking screws 15 and handles 16 to assist in mounting it. The inner face of this element is provided with long ribs 17, Fig. 7, alternating with short ribs 18.

Coöperating with cone 14 are four connected truncated elements, 19, 20, 21 and 22, arranged to form a single cone, the upper, smaller element 19 being held on shaft portion 6 by nuts 23, the truncated cones being bolted together, by bolts 24.

Figure 3:
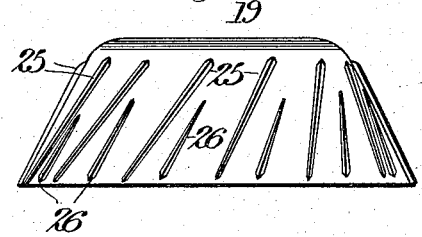
Figure 4:
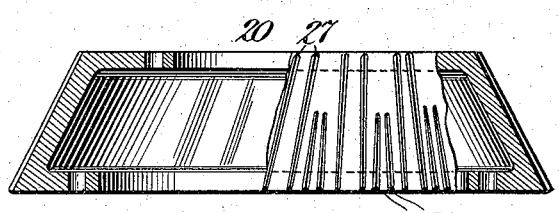
Figure 5:
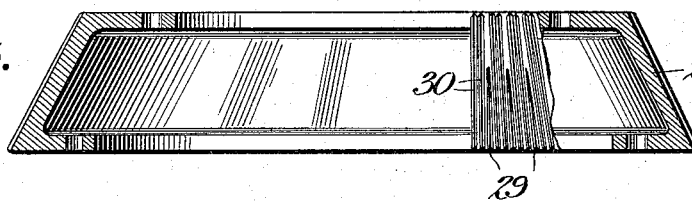
Figure 6:
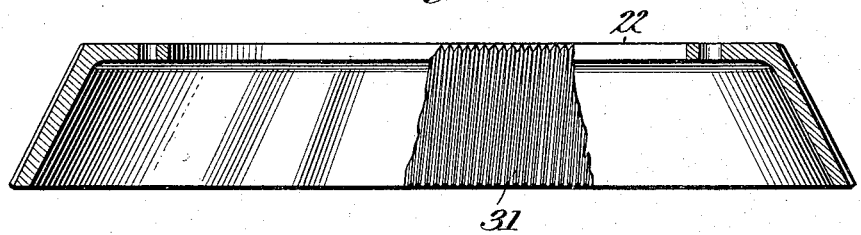

The smallest element, 19, Fig. 3, is provided with long and short ribs 25 and 26, spaced wide apart, the two following elements, 20 and 21, Figs. 4 and 5, have similar ribs 27, 28, 29 and 30, respectively, spaced closer together, while the last element, 22, Fig. 6, has only long ribs, diverging toward their lower ends.

The shaft portion 6 is provided with a ball thrust bearing 31, and below it, in the portion 5, is a miter-gear 32 driven by a miter-gear 33 on a driving shaft 34, mounted in ball-bearings 35 and 36. The driving shaft 34 carries a sprocket 37 for driving an elevator, should one be desired to carry the shrubs to the hopper.

It should be noted that none of the triturating ribs have sharp edges, see Fig. 8, as a shearing or cutting action is to be avoided, and only trituration effected by the co-acting ribbed surfaces.

The shrubs, or only the barks, if desired, are preferably subjected to a preliminary crushing between two cylinders, rotating at the same speed. This operation has the effect of crushing, without cutting, and welding the rubber filaments together, and in so doing raises to a considerable degree the facility of extracting the rubber, by crushing the inner stratum of the bark. The material is then fed into the hopper extension 12, and is moved by blades 13 to the screw surfaces 8 and 10. The material is sufficiently triturated between these surfaces to feed between cones 14, and 19, 20, 21 and 22, issuing from the lower cone 22 as a flour, with which the agglomerated rubber is mixed.

The heat developed in the triturating operation assists the agglomeration of the rubber, and the mixed product of the triturating operation is separated by screening.

In Fig. 3, the ribs 25 and 26 which are wide apart, taper from one end to the other oppositely, and lie preferably at different angles on the surface element 19, i. e. they differ in pitch.

In Fig. 4, the ribs 27 and 28 alternate in pairs.

In Fig. 5 one short rib and a pair of long ribs alternate, while in Fig. 6 all the ribs are long and taper from their upper wider ends to their lower narrower ends, as do all the long ribs in Figs. 3 to 7.

The interspace between the conical stationary and movable triturating members varies from top to bottom, conveniently from one-fourth to one-sixteenth of an inch.

I claim—

1. A triturating machine comprising an open supporting frame, a cylinder vertically mounted therein, and having a helically grooved internal surface, an inverted conical hopper mounted in the upper end of the cylinder, a vertical shaft journaled at its lower end and having its free end projecting into the hopper, feed blades on the free end of the shaft, a screw having beveled edges formed on the shaft within and coöperating with the internal surface of the cylinder, a conical member detachably suspended from the lower end of the cylinder and provided with internal, straight, alternating long and short ribs, a detachably connected element fixed to the shaft within said conical member and having inclined ribs coöperating with the ribs of the conical member, said inclined ribs gradually decreasing in inclination and increasing in number from the top to the bottom element, and means to rotate the shaft.

2. In a triturating machine, a feed hopper, a shaft whose free end projects into the hopper, a breaker on said projecting end, coöperating crushing members below said hopper, one of which is mounted on said shaft, and means to journal said shaft below the breaking and crushing zones.

3. In a triturating machine, a casing having a feed hopper, a coarse grinder element below said hopper and a triturator element below the grinder element, a driven shaft whose free end projects into the hopper, a breaker element on said shaft, a forcing screw on said shaft coöperating with the grinding element and progressive triturating means on said shaft coöperating with the triturating element on the casing, and means to journal said shaft below the zones of operation of said elements.

In testimony that I claim the foregoing as my invention, I have signed my name in presence of two subscribing witnesses.

DOMINIQUE VECCHINI.

Witnesses:
A. H. LEVY,
HYMAN GORDON.

Copies of this patent may be obtained for five cents each, by addressing the "Commissioner of Patents, Washington, D. C."